US010510002B1

(12) United States Patent
Olabiyi et al.

(10) Patent No.: US 10,510,002 B1
(45) Date of Patent: Dec. 17, 2019

(54) STOCHASTIC GRADIENT BOOSTING FOR DEEP NEURAL NETWORKS

(71) Applicant: Capital One Services, LLC, McLean, VA (US)

(72) Inventors: Oluwatobi Olabiyi, Arlington, VA (US); Erik T. Mueller, Chevy Chase, MD (US); Christopher Larson, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/276,306

(22) Filed: Feb. 14, 2019

(51) Int. Cl.
  *G06N 3/08* (2006.01)
  *G06N 3/04* (2006.01)
  *G06N 20/00* (2019.01)

(52) U.S. Cl.
  CPC ............ *G06N 3/08* (2013.01); *G06N 3/0472* (2013.01); *G06N 20/00* (2019.01)

(58) Field of Classification Search
  CPC ........ G06N 3/02; G06N 3/0472; G06N 20/00; G06N 20/20
  See application file for complete search history.

(56) References Cited

U.S. PATENT DOCUMENTS

2019/0050667 A1* 2/2019 Wang .................. G05D 1/0246

OTHER PUBLICATIONS

Meir, Ron et al.; An Introduction to Boosting and Leveraging; Springer-Verlag; 2003; Advanced Lectures on Machine Learning; pp. 118-183. (Year: 2003).*
Cortes, Corinna et al.; Deep Boosting; 2014; Proceedings of the 31st International Conference on Machine Learning; 9 pages. (Year: 2014).*
Han, Shizhong et al.; Incremental Boosting Convolutional Neural Network for Facial Action Unit Recognition; 2016; pp. 1-9. (Year: 2016).*
Couso, Ines et al.; Machine learning models, epistemic set-valued data and generalized loss function: An encompassing approach; Elsevier; Information Sciences 358-359 (2016) 129-150. (Year: 2016).*

(Continued)

*Primary Examiner* — Stanley K. Hill
(74) *Attorney, Agent, or Firm* — Banner & Witcoff, Ltd.

(57) ABSTRACT

Aspects described herein may allow for the application of stochastic gradient boosting techniques to the training of deep neural networks by disallowing gradient back propagation from examples that are correctly classified by the neural network model while still keeping correctly classified examples in the gradient averaging. Removing the gradient contribution from correctly classified examples may regularize the deep neural network and prevent the model from overfitting. Further aspects described herein may provide for scheduled boosting during the training of the deep neural network model conditioned on a mini-batch accuracy and/or a number of training iterations. The model training process may start un-boosted, using maximum likelihood objectives or another first loss function. Once a threshold mini-batch accuracy and/or number of iterations are reached, the model training process may begin using boosting by disallowing gradient back propagation from correctly classified examples while continue to average over all mini-batch examples.

20 Claims, 4 Drawing Sheets

(56) References Cited

OTHER PUBLICATIONS

Zhang, Fan et al.; Scene Classification via a Gradient Boosting Random Convolutional Network Framework; IEEE Transactions on Geoscience and Remote Sensing, vol. 54, No. 3, Mar. 2016; pp. 1793-1802. (Year: 2016).*

Friedman, J. Stochastic gradient boosting. Computational Statistics & Data Analysis—Nonlinear methods and data mining, 38(4):367-378, 2002.

Aghajanyan, A. Softtarget regularization: An effective technique to reduce over-fitting in neural network. In arXiv preprint arXiv:1609.06693, 2016.

Xie, L., Wang, J., Wei, Z., Wang, M., and Tian, Q. Disturblabel: Regularizing cnn on the loss layer. In arXiv preprint arXiv:1605.00055, 2016.

Schwenk, H. and Bengio, Y. Boosting neural networks. Neural Comput., 12(8):1869-1887, 2000.

Long, P. M. and Servedio, R. A. Random classification noise defeats all convex potential boosters. In Proceedings of the 25th International Conference on Machine Learning, 2008.

Wan, L., Zeiler, M., Zhang, S., LeCun, Y., and Fergus, R. Regularization of neural networks using dropconnect. In Proceedings of the 30th International Conference on Machine Learning, 2013.

Friedman, J. Greedy function approximation: A gradient boosting machine. The Annals of Statistics, 29(5), 2001.

Pereyra, G., Tucker, G., Chorowski, J., Kaiser, L., and Hinton, G. Regularizing neural networks by penalizing confident output distributions. In arXiv preprint arXiv:1701.06548, 2017.

Srivastava, N., Hinton, G., Krizhevsky, A., Sutskever, I., and Salakhutdinov, R. Dropout: A simple way to prevent neural networks from overfitting. Journal of Machine Learning Research, 15(1):1929-1958, 2014.

Szegedy, C., Vanhoucke, V., Ioffe, S., and Shlens, J. Rethinking the inception architecture for computer vision. In arXiv preprint arXiv:1512.00567, 2015.

Alemi, A. A., Fischer, I., Dillon, J. V., and Murphy, K. Deep variational information bottleneck. In arXiv preprint arXiv:1612.00410, 2017.

Bandanau, D., Cho, K., and Bengio, Y. Neural machine translation by jointly learning to align and translate. In Proceedings of International Conference of Learning Representation (ICLR 2015), 2015.

Bengio, Y., Ducharme, R., Vincent, P., and Janvin, C. A neural probabilistic language model. Journal of Machine Learning Research, 3(3):1137-1155, 2003.

Bottou, L. Large-scale machine learning with stochastic gradient descent. In International Conference on Computational Statistics, 2010.

Cho, K., Merrienboer, B., Gulcehre, C., Bandanau, D., Bougares, F., Schwenk, H., and Bengio, Y. Learning phrase representations using rnn encoder-decoder for statistical machine translation. In Proceedings of International Conference of Learning Representation (ICLR 2015), pp. 1724-1734, 2014.

Graves, A. Sequence transduction with recurrent neural networks. In Proceedings of the 29th International Conference on Machine Learning (ICML 2012), 2012.

Graves, A., Mohamed, A., and Hinton, G. Speech recognition with deep recurrent neural networks. In Proceedings of 2013 IEEE international conference on acoustics, speech and signal processing, pp. 6645-6649, 2013.

Hinton, G., Deng, L., Yu, D., Dahl, G., Mohamed, A., Jaitly, N., Senior, A., Vanhoucke, V., Nguyen, P., Sainath, T., and Kingsbury, B. Deep neural networks for acoustic modeling in speech recognition: The shared views of four research groups. IEEE Signal Processing Magazine, 29 (3):82-97, 2012.

Ioffe, S. and Szegedy, C. Batch normalization: Accelerating deep network training by reducing internal covariate shift. In arXiv preprint arXiv:1502.03167, 2015.

Li, J., Galley, M., Brockett, C., Gao, J., and Dolan, B. A diversity-promoting objective function for neural conversation models. In Proceedings of NAACL-HLT, 2016.

Lin, C. Y. Rouge: a package for automatic evaluation of summaries. In Proceedings of the Workshop on Text Summarization Branches Out, 2014.

Lin, T., Goyal, P., Girshick, R., He, K., and Dollar, P. Focal loss for dense object detection. In arXiv preprint 1708.02002v2, 2018.

Mikolov, T., Karafit, M., Burget, L., Cernocky, J., and Khudanpur, S. Recurrent neural network based language model. In Proceedings of the 11th Annual Conference of the International Speech Communication Association (INTERSPEECH 2010), 2010.

Norouzi, M., Bengio, S., Chen, Z., Jaitly, N., Schuster, M., Wu, Y., and Schuurmans, D. Reward augmented maximum likelihood for neural structured prediction. In arXiv preprint arXiv:1609.00150v3, 2016.

Olabiyi, O., Salimov, A., Khazane, A., and Mueller, E. Multi-turn dialogue response generation in an adversarial learning framework. In arXiv preprint arXiv:1805.11752, 2018.

Papineni, K., Roukos, S., Ward, T., and Zhu, W. Bleu: A method for automatic evalution of machine translation. In Proceedings of the 40th Annual Meeting of the Association for Computational Linguistics, pp. 311-318, 2002.

Serban, I., Sordoni, A., Bengio, Y., Courville, A., and Pineau, J. Building end-to-end dialogue systems using generative hierarchical neural network models. In Proceedings of The Thirtieth AAAI Conference on Artificial Intelligence (AAAI 2016), pp. 3776-3784, 2016.

Serban, I. V., Sordoni, A., Lowe, R., Charlin, L., Pineau, J., Courville, A., and Bengio, Y. A hierarchical latent variable encoder-decoder model for generating dialogue. In Proceedings of the Thirty-first AAAI Conference on Artificial Intelligence (AAAI 2017), 2017.

Sutskever, I., Vinyals, O., and Le, Q. Sequence to sequence learning with neural networks. In Proceedings of Advances in Neural Information Processing Systems (NIPS), pp. 3104-3112, 2014.

Vinyals, O., and Le, Q. A neural conversational model. In Proceedings of the ICML Deep Learning Workshop, 2015.

* cited by examiner

```
/// DeepBoost Algorithm 1   define      training set $\mathcal{D}$ of size N, $\mathcal{D} \equiv \{(x^{(i)}, y^{*(i)})\}_{i=1}^{N}$
2   define      burn in iterations $t_b$
3   define      accuracy threshold $acc_{th}$
4
5   initialize  model $F(x, \theta_t)$, initial step $t$
6
7   for each mini-batch $\mathcal{D}_t$ of size M < N, $\mathcal{D}_t \equiv \{(x^{(m)}, y^{*(m)})\}_{m=1}^{M}$
8   {
9       if ($acc_{Dt} < acc_{th}$ AND $t < t_b$) then
10          compute $\mathcal{L}_{ML}(\theta_t; \mathcal{D}_t) = \frac{1}{|\mathcal{D}_t|} \sum_{(x, y^*) \in \mathcal{D}_t} -\log p_\theta(y^*|x)$
11      else
12          compute $\mathcal{L}_{DB}(\theta_t; \mathcal{D}_t) = \frac{1}{|\mathcal{D}_t|} \sum_{(x, y^*) \in \mathcal{D}_t, \hat{y} \neq y^*} -\log p_\theta(y^*|x)$
13      end if
14      update model parameters $\theta_{t+1} = \theta_t + \gamma_t \nabla_{\theta_t} \mathcal{L}(\theta_t; \mathcal{D}_t)$
15      if (stopping criteria met) then break
16      increment t
17  }
18  return trained model $F(x, \theta_F)$
```

FIG. 4

STOCHASTIC GRADIENT BOOSTING FOR DEEP NEURAL NETWORKS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

Aspects of the disclosure relate generally to machine learning. More specifically, aspects of the disclosure may provide for enhanced training of models that use a deep neural network architecture based on features similar to stochastic gradient boosting.

BACKGROUND

Deep neural network models may contain millions of parameters that extract hierarchies of features from data, enabling them to learn from a large amount of data compared to earlier shallow networks. However, deep neural networks often suffer from overfitting and a lack of generalization due to their large capacity. This may result from learning stages throughout the model training process. Due to the nature of deep neural networks, models may learn based on (i) connecting input and output labels by extracting predictive features from the input; (ii) statistics associated with output labels (e.g., likelihood of the output itself); and (iii) connecting non-predictive features in the input to output labels. It is desirable that models focus on the predictive features of (i) and avoid learning from non-predictive aspects (ii) and (iii). Structuring model training processes so the model learns in this way has proven difficult, as deep neural networks typically maximize the conditional probability $P(y|x)$ of the output (y) given input features (x), instead of maximizing mutual information, $P(y|x)/P(y)$ between the output and input.

Stochastic gradient boosting has been used in machine learning to combine the capacity of multiple shallow or weak learners to form a deep or strong learner. A data set may be split among multiple weak learners, and weak models may specialize on fractions of the data set. Application of stochastic gradient boosting to an ensemble of decision trees is described in J. Friedman, "Greedy Function Approximation: A Gradient Boosting Machine," The Annals of Statistics, Vol. 29, No. 5, 2011, which is incorporated herein by reference. But stochastic gradient boosting has been considered infeasible for application to training deep neural networks. It has been observed that application of Friedman's stochastic gradient boosting to deep neural network training often led to training instability. See, e.g., Philip M. Long, et al, "Random Classification Noise Defeats All Convex Potential Boosters," in Proceedings of the 25th International Conference on Machine Learning, Helsinki, Finland, 2008. Since deep neural networks are strong learners by design, model gradients are generally not boosted during computation as it has been seen as computationally prohibitive. And other gradient descent-based boosting algorithms suffer from a labelling noise problem that hinders model training.

Aspects described herein may address these and other problems, and generally improve the quality, efficiency, and speed of machine learning systems by offering improved model training through regularizing model training, improving network generalization, and abating the deleterious effect of class imbalance on model performance.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for the application of stochastic gradient boosting techniques to the training of deep neural networks. This may have the effect of regularizing model training, improving network generalization, and abating the deleterious effect of class imbalance on model performance. According to some aspects, these and other benefits may be achieved by disallowing gradient back propagation from examples that are correctly classified by the neural network model while still keeping correctly classified examples in the gradient averaging. In implementation, this may be effected by multiplying the contribution of correctly classified examples to a loss function by a weighting factor of 0 while still averaging over the full mini-batch. Removing the gradient contribution from correctly classified examples may regularize the deep neural network and prevent the model from overfitting to statistics and noise associated with the training set.

Further aspects described herein may provide for scheduled boosting during the training of the deep neural network model. Model training using boosting techniques described herein may be slower during early iterations. In some instances, model training using boosting during early iterations may prevent the model from learning predictive but non-discriminant features from the input. Thus, some aspects may provide scheduled boosting conditioned on a mini-batch accuracy and/or a number of training iterations. The model training process may start un-boosted, using maximum likelihood objectives or another first loss function. This may allow the model to learn predictive but non-discriminant features first. Once a threshold mini-batch accuracy and/or number of iterations are reached, the model training process may begin using boosting as described herein, e.g., disallowing gradient back propagation from correctly classified examples while continue to average over all mini-batch examples. This scheduled boosting may avoid overfitting associated with continued model training using maximum likelihood objectives.

More particularly, some aspects described herein may provide a computer-implemented method for training a model having a deep neural network architecture and a plurality of model parameters. The method may comprise initializing the model to have a set of initial parameters. A training set comprising a plurality of examples may be determined and used to train the model. The method may comprise training the model for a first number of iterations, up to a burn-in threshold count of iterations, to refine the plurality of model parameters by updating the plurality of model parameters based on minimizing an average gradient of a first loss function for each example in mini-batches of the training set. This may be done using the maximum likelihood objective for training deep neural networks. The first loss function may be a function of the negative log-likelihood of the input and outputs of each example. The method may further comprise training the model for a second number of iterations to refine the plurality of model parameters by updating the plurality of model parameters based on minimizing an average gradient of a second loss function for each example in the second mini-batch. The second loss function may be weighted such that correctly classified examples are given zero weight, and the average gradient of the second loss function may be determined based on a total size of the second mini-batch. The second loss function may be a weighted negative log-likelihood of the inputs and outputs of each example, and correctly classified examples may be assigned a zero weighting. Stopping criteria may determine when the model is sufficiently trained, and the trained model may be used in generating one or more predictions based on input data.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 depicts example computer code in accordance with one or more illustrative aspects discussed herein.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for applying stochastic gradient boosting techniques to train a deep neural network model. A weighting factor may be added to a loss function such that correctly classified examples may have a zero contribution to the computed mini-batch loss. But the gradient average may continue to be calculated over the full size of the mini-batch. As discussed further herein, this combination of features may allow for boosting in the training of deep neural networks.

Before discussing these concepts in greater detail, however, several examples of a computing device that may be used in implementing and/or otherwise providing various aspects of the disclosure will first be discussed with respect to FIG. 1.

Figure 1:
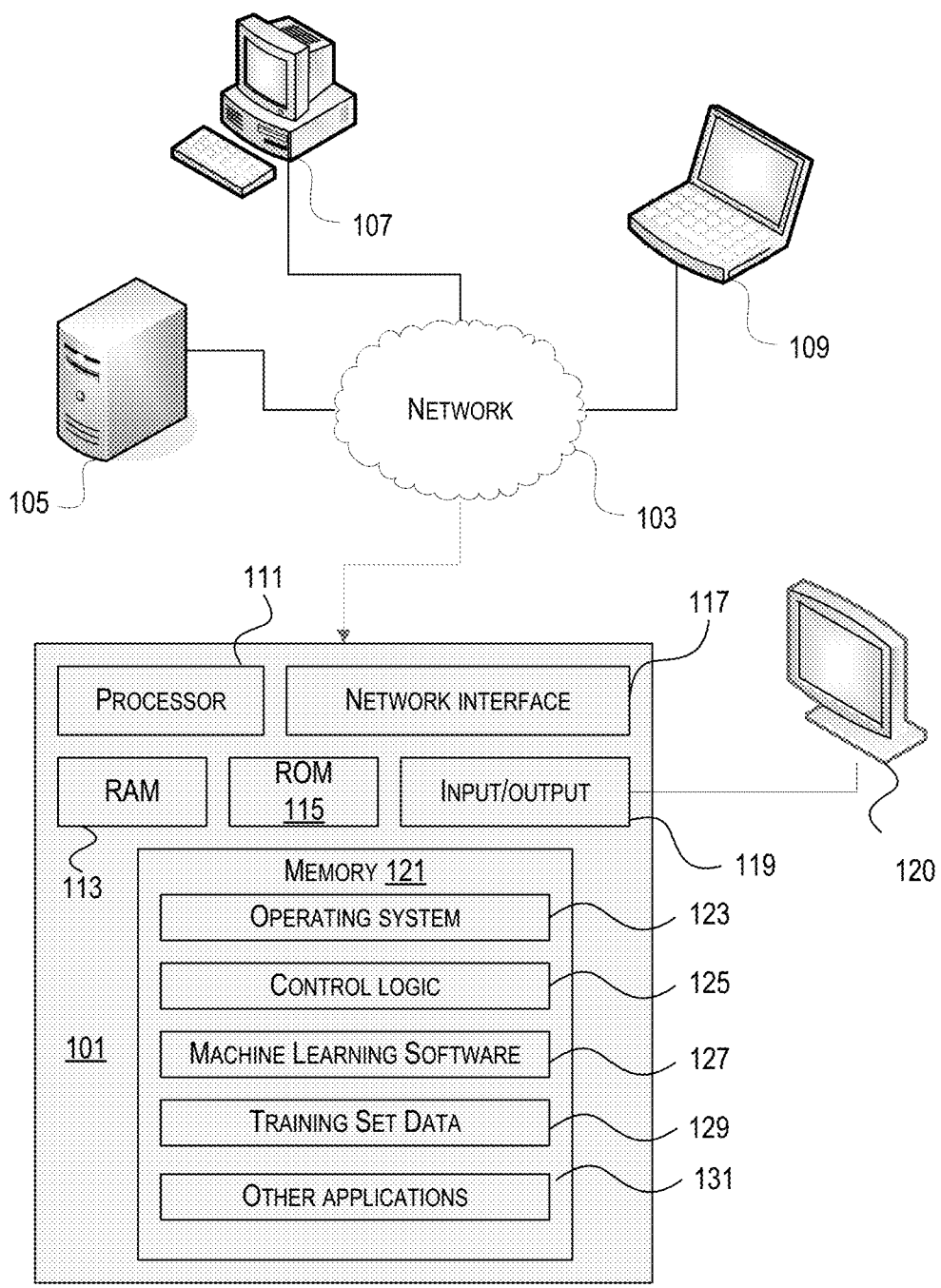
FIG. 1 depicts an example of a computing device that may be used in implementing one or more aspects of the disclosure in accordance with one or more illustrative aspects discussed herein.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, training set data 129, and other applications 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to a method for using stochastic gradient boosting techniques to train deep neural networks.

Figure 2:
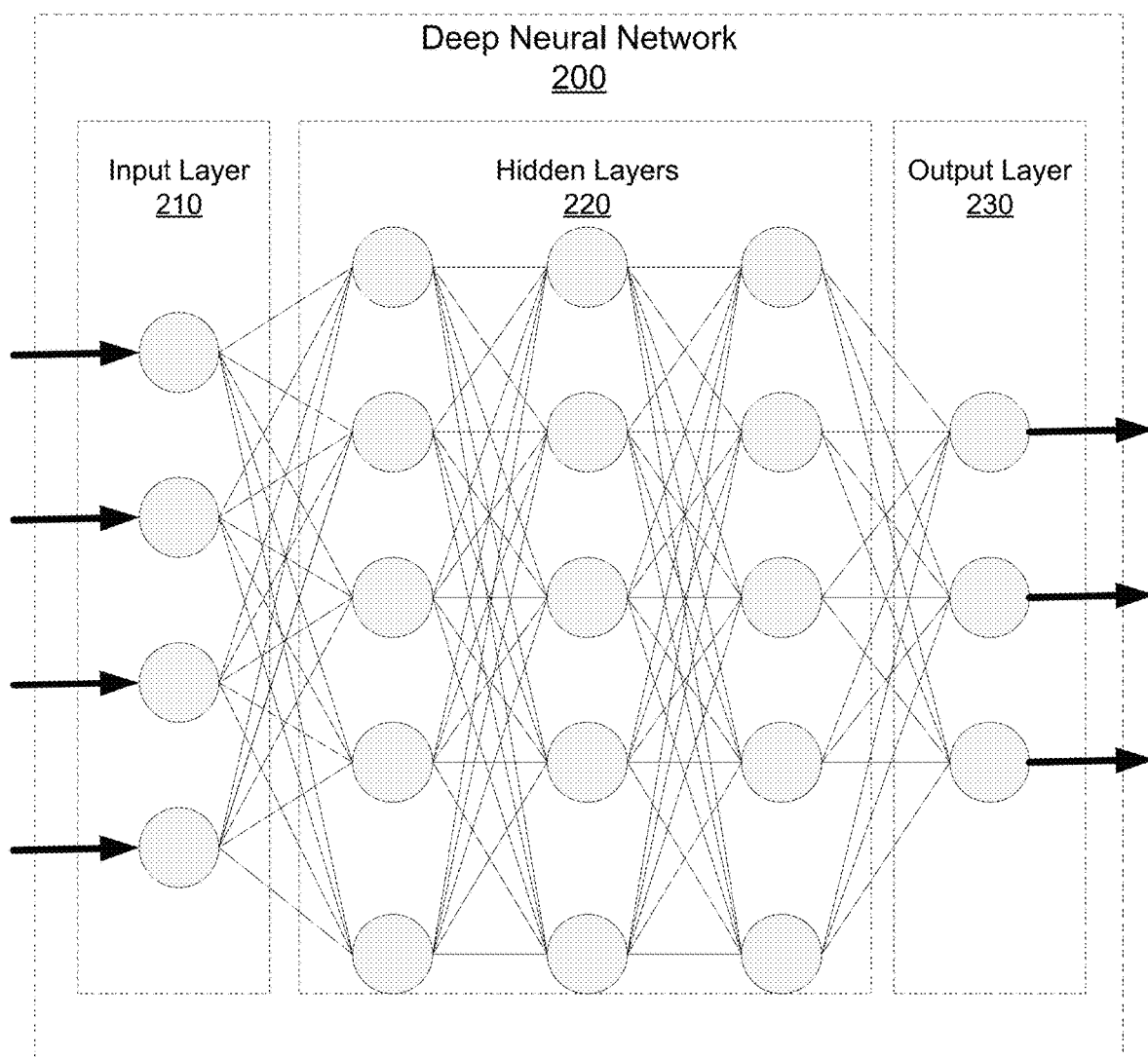
FIG. 2 depicts an example deep neural network architecture for a model according to one or more aspects of the disclosure.

FIG. 2 illustrates an example deep neural network architecture 200. An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others. Aspects described herein may be used with any type of deep neural network, and for any suitable application, particularly where a maximum likelihood objective is used during training.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model. Use of stochastic gradient descent algorithms to train neural networks is described in L. Bottou, "Large-scale Machine Learning with Stochastic Gradient Descent," in International Conference on Computational Statistics, 2010, which is incorporated herein by reference. One approach to training the model is based on a maximum likelihood framework that aims to minimize a negative log-likelihood of the parameters given the training set data. But strict training based solely on the maximum likelihood framework may result in model over confidence. Thus, according to some aspects, boosting techniques may be employed to introduce a regularization that disallows the over confidence associated with pure maximum likelihood by removing the loss contributions from correctly predicted examples, as discussed further below.

Given a dataset of input-output pairs, $\mathcal{D} \equiv \{(x^{(i)}, y^{*(i)})\}_{i=1}^{N}$, a deep neural network model may learn a parametric conditional probability $p_\theta(y|x)$, which scores different output hypotheses, $y \in \mathcal{Y}$, where $\theta$ is the model parameters and $\mathcal{Y}$ is the finite set of possible output of size N.

The maximum likelihood (ML) framework tries to minimize negative log-likelihood of the parameters given the data, as shown in equation (1):

$$\mathcal{L}_{ML}(\theta, \mathcal{D}) = \sum_{(x, y^*) \in \mathcal{D}} -\log p_\theta(y^* | x)$$

where y* is the ground truth for input x in the training data set. Model parameters θ may be initialized as a set of white noises $\theta_0$, then updated using stochastic gradient descent (SGD) as described in L. Bottou, "Large-scale Machine Learning with Stochastic Gradient Descent," in International Conference on Computational Statistics, 2010, previously incorporated by reference. The $t^{th}$ iteration of SGD updates the current parameters $\theta_t$ as shown in equation (2):

$$\theta_{t+1} = \theta_t + \gamma_t \nabla_{\theta_t} \mathcal{L}_{ML}(\theta_t, \mathcal{D}_t)$$

where the maximum likelihood loss function, $\mathcal{L}_{ML}(\theta_t, \mathcal{D}_t)$, is defined as shown in equation (3):

$$\mathcal{L}_{ML}(\theta_t, \mathcal{D}_t) = \frac{1}{|\mathcal{D}_t|} \sum_{(x, y^*) \in \mathcal{D}_t} -\log p_\theta(y^* | x)$$

and where $\nabla_{\theta_t} \mathcal{L}_{ML}(\theta_t, \mathcal{D}_t)$ is computed using gradient backpropagation. $\mathcal{D}_t$ is a mini-batch that may be randomly drawn from the training dataset $\mathcal{D}$, and $\gamma_t$ is the learning rate.

Minimizing the objective of equation (1) using SGD in equation (2) without regularization may increase the conditional probability of the target outputs, $p_\theta(y|x)$, while decreasing the conditional probability of alternative incorrect outputs. This may lead to model over-confidence as discussed in Pereyra et al., "Regularizing Neural networks by Penalizing Confident Output Distributions," in *arXiv preprint arXiv:*1701.06548, 2017, incorporated herein by reference. This model over-confidence may be caused by aspects of equation (3), because according to equation (3) all negative outputs are equally wrong, and none is preferred over the others.

Accordingly, some aspects described herein may introduce a regularization that may disallow the model over-confidence associated with equation (3) by removing loss contribution from correctly predicted examples. This regularization may comprise a weighting factor added to the loss function, as shown in "DeepBoost" equation (4):

$$\mathcal{L}_{DB}(\theta_t, \mathcal{D}_t) = \frac{1}{|\mathcal{D}_t|} \sum_{(x,y^*)\in\mathcal{D}_t} -(1 - \lambda(\hat{y}, y^*))\log p_\theta(y^* | x)$$

where $\lambda(\hat{y}, y^*)\in[0, 1]$ is the similarity measure between the predicted output $\hat{y}$ and the ground truth $y^*$. $\hat{y}$ may be the maximum likelihood output, which may be defined according to equation (5):

$$\hat{y} = \mathrm{argmax}_y p_\theta(y|x)$$

In some implementations, the weighting factor may be based on the conditional probability $p_\theta(y|x)$ as shown in equation (6):

$$\lambda(\hat{y},y^*) = p_\theta(y|x)$$

However, $p_\theta(y|x)$ may not be an unbiased estimate of the similarity distance as the model parameter is still being learned. Yet, this may still yield an improved performance over the non-boosted case.

According to some aspects, more drastic boosting of the wrongly predicted examples may be employed by causing the negative log likelihood loss of the correctly predicted examples to reach zero from the iterative parameter update. This may be accomplished via the weighting factor $\lambda(\hat{y}, y^*)$, which may provide zero weight for correctly classified examples while still maintaining the loss contribution of incorrectly classified examples. For example, the weighting factor $\lambda(\hat{y}, y^*)$ may be defined as shown in equation (7):

$$\lambda(\hat{y}, y^*) = \begin{cases} 0 & \text{if } \hat{y} \neq y^* \\ 1 & \text{if } \hat{y} = y^* \end{cases}$$

Using equation (7), equation (4) may be rewritten as equation (8), shown below:

$$\mathcal{L}_{DB}(\theta_t, \mathcal{D}_t) = \frac{1}{|\mathcal{D}_t|} \sum_{(x,y^*)\in\mathcal{D}_t, \hat{y}\neq y^*} -\log p_\theta(y^* | x)$$

It is straight forward to show that equation (8) can be expressed as equation (9):

$$\mathcal{L}_{DB}(\theta_t, \mathcal{D}_t) = (1 - acc\,\mathcal{D}_t)\mathcal{L}_{DB}(\theta_t, \mathcal{D}_{t,\hat{y}\neq y^*})$$

where $acc\,\mathcal{D}_t$ is the mini-batch accuracy, $|\mathcal{D}_{t,\hat{y}\neq y^*}|/|\mathcal{D}_t|$, and where $\mathcal{L}_{DB}(\theta_t, \mathcal{D}_{t,\hat{y}\neq y^*})$ is defined as shown in equation (10):

$$\mathcal{L}_{DB}(\theta_t, \mathcal{D}_{t,\hat{y}\neq y^*}) = \frac{1}{|\mathcal{D}_{t,\hat{y}\neq y^*}|} \sum_{(x,y^*)\in\mathcal{D}_{t,\hat{y}\neq y^*}} -\log p_\theta(y^* | x)$$

Another way to achieve this is to modify the similarity measure $\lambda(\hat{y}, y^*)$ to allow back-propagation on a correctly predicted example until the model confidence on such an example exceeds a confidence threshold $p_{th}$. In this case, $p_{th}$ becomes a training hyperparameter that allows training on predictive but not discriminative features. The modified similarity measure is then given by equation (7.2):

$$\lambda(\hat{y}, y^*) = \begin{cases} 1 & \text{if } \hat{y} = y^* \text{ and } p_\theta(y|x) > p_{th} \\ 0 & \text{otherwise} \end{cases}$$

The form of equation (9) illustrates several distinctions of the deep neural network boosting techniques discussed herein relative to traditional boosting techniques. First, minimizing equation (9) may simultaneously maximize both the mini-batch accuracy and the likelihood of the ground truth label $y^*$. Second, the term $(1-acc\,\mathcal{D}_t)$ may provide a reinforcement signal that scales the average negative output loss, $\mathcal{L}_{DB}(\theta_t, \mathcal{D}_{t,\hat{y}\neq y^*})$, and may provide useful gradient descent direction. Without it, the network may receive about the same average loss value from iteration to iteration leading to training instability. Thus, a naive application of traditional boosting techniques does not work well for deep neural network training.

Use of DeepBoost equation (4) and its derived functions may act as a regularizer during model training. With DeepBoost, there may be no parameter update for true positive outputs which may be the cause of over-confidence in maximum likelihood models. Confidence adjustment may be made through the parameter update only to correct the false positive and false negative predictions. That may mean that the model can focus on learning only the discriminative features. However, this may come at the expense of ignoring predictive features that are not necessarily discriminative during training and may present problems for small datasets. To overcome this, according to some aspects, the model may be initially trained using the maximum likelihood objective defined in equation (3), then training may switch to the DeepBoost objective defined in equation (4) after a threshold number of iterations or when the mini-batch accuracy $acc\,\mathcal{D}_t$ exceeds a threshold value $acc_{th}$ (or both).

Use of DeepBoost equation (4) and its derived functions may act as a class balancer during model training and may prevent the deleterious effect of class imbalance. The DeepBoost techniques and equations may enable the system to filter out the statistics of the label $y^*$ in the output distribution (e.g., the likelihood of the output itself), which may lead to a better calibration and tighter correlation between x and $y^*$. This benefit may be observed in comparison to the mutual information maximization objective. If the likelihood function in equation (3) is replaced with the mutual information between x and $y^*$, we obtain equation (11):

$$\mathcal{L}_{MI}(\theta_t, \mathcal{D}_t) = \frac{1}{|\mathcal{D}_t|} \sum_{(x,y^*)\in\mathcal{D}_t} -(\log p_\theta(y^* | x) - \log p_\theta(y^*))$$

Comparing equations (3), (4), and (11) shows that Deep-Boost may provide a tighter bound than the maximum likelihood objective as shown in equation (12):

$$\mathcal{L}_{MI}(\theta_t, \mathcal{D}_t) \geq \mathcal{L}_{DB}(\theta_t, \mathcal{D}_t) \geq \mathcal{L}_{ML}(\theta_t, \mathcal{D}_t)$$

Reviewing equation (4), its form indicates that $p_\theta(y^*|x)^{\lambda(\hat{y},y^*)}$ may serve as a good proposal distribution for $p_\theta(y^*)$ with an acceptance probability of $p_\theta(\hat{y})$, as shown below in equation (13):

$$p_\theta(y^*) \approx p_\theta(y^*|x)^{\lambda(\hat{y},y^*)}$$

Use of DeepBoost equation (4) and its derived functions may act as a learning rate adapter during model training. Reviewing equation (9), it may be seen that the DeepBoost feature illustrated in equation (9) may be equivalent to scaling the learning rate by a factor of $(1 - acc \mathcal{D}_t)$. That is, the learning may decrease as the model becomes better and it varies from mini-batch to mini-batch. This learning rate adaptation may be even more important in that it can be used as a stopping criterion for model training. Once the accuracy reaches 100%, the model may stop training, removing the need for model selection through another validation set. For further flexibility, some implementations may add a tunable acceleration parameter, $\gamma \geq 0$ to the boosted loss in (9), yielding equation (14):

$$\mathcal{L}_{DB}(\theta_t, \mathcal{D}_t) = (1 - acc \mathcal{D}_t)^\gamma \mathcal{L}_{DB}(\theta_t, \mathcal{D}_{t,\hat{y}\sim y^*})$$

However, $\gamma=1$ may be good enough for most applications in practice and thus the acceleration parameter may be omitted to avoid a need for additional hyperparamter tuning.

The DeepBoost equation (4) and its derived functions may find application in sequence generation domains. Much of the above discussion about DeepBoost may assume a single label configuration. Although applying equation (14) to every token of a generated sequence may work well for sequence generation tasks, better performance may be obtained by boosting only a part of the sequence. This may be due to the entropy profile of the target sequence. For a typical dialogue dataset, the target sequence entropy vs token position is concave with the beginning and the end of the sequence typically having lower entropy than the middle. This initial positive energy gradient may create a learning barrier and may be the reason for typically short and generic outputs in most neural dialogue generation models. That is, it may be easier to learn the beginning and the end of the response (with lower entropy) than the middle. Boosting techniques may be applied until the position of maximum entropy $l_b$. Beyond that, the system may switch to normal maximum likelihood loss. This may agree with the observation that only the first few tokens of the generated sequence may determine the trajectory of the entire response. Shorter boosting lengths may lead to improved quality of the model's output in implementations.

As a particular example application, the DeepBoost equation (4) and its derived functions may find use in a sequence generation application as an artificial intelligence (AI) chatbot. The AI chatbot may be configured to interface with customers via free form text entry, and may apply natural language processing (NLP) to determine intentions and other meaning from user-entered text. A deep neural network trained using the DeepBoost techniques (and/or other techniques discussed herein) may take the user-entered text as input and generate as output an indication of the user's intention and/or a response to the user's request. According to some aspects, and as described above, the DeepBoost techniques may be applied to the first few words and/or last few words (e.g., first 3 words and last 3 words) of training sequences, while maximum likelihood may be applied to the middle portions. As described above, this may lead to improved quality of the model's output in this application. For example, this may allow the model to leverage the beneficial improvements in output quality for more important parts of the sequence input while maintaining satisfactory computation speeds for less important parts of the sequence.

Having discussed the detailed computations which may enable a deep neural network model to be trained using boosting techniques, discussion will now turn to an illustrative method for training a deep neural network model using boosting via a weighted loss function.

Figure 3:
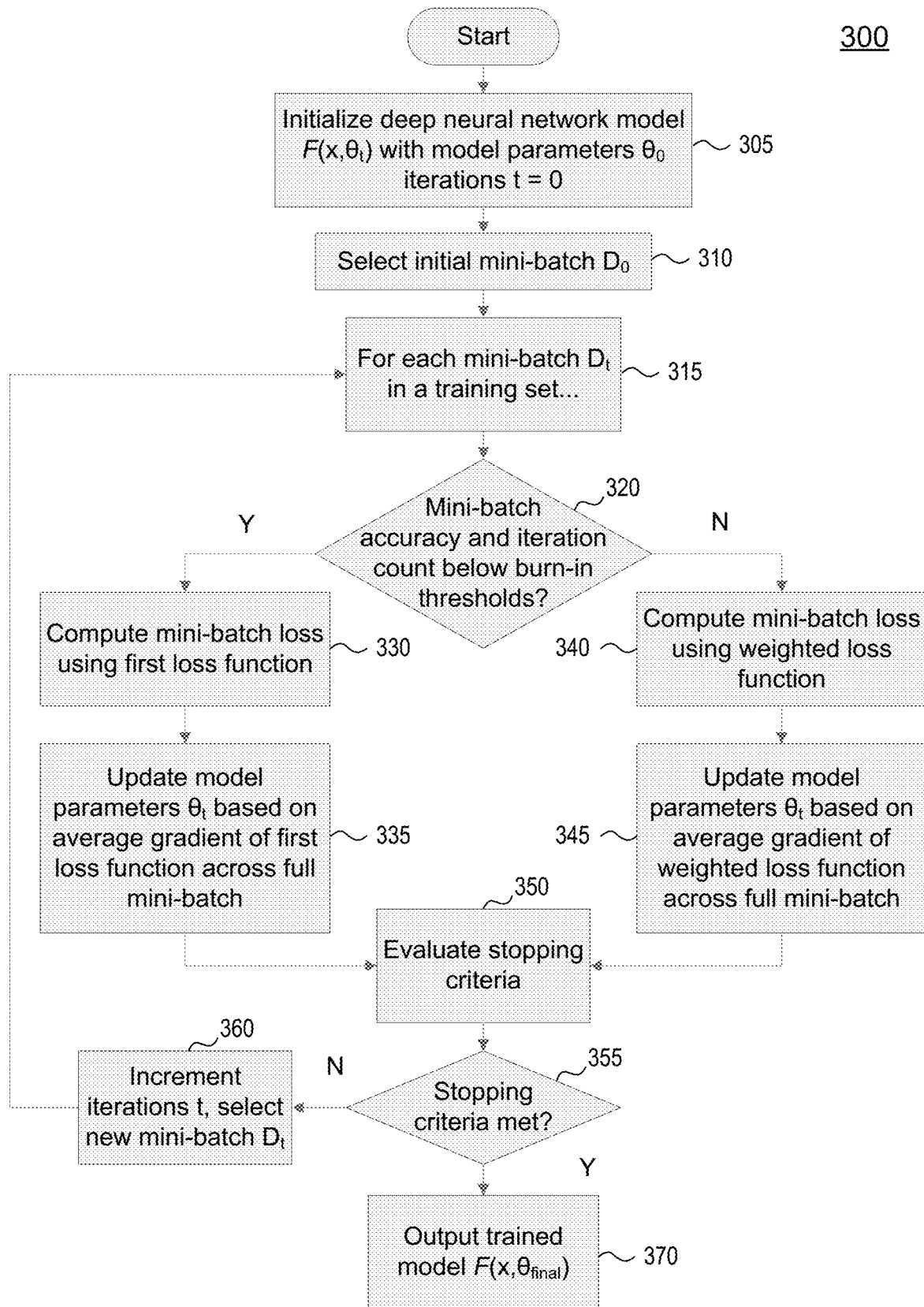
FIG. 3 depicts a flow chart for a method of training a model according to one or more aspects of the disclosure.

FIG. 3 illustrates an example method 300 for training a model having a deep neural network architecture in accordance with one or more aspects described herein. As used herein (and as discussed above with respect to FIG. 2), a deep neural network may be an artificial neural network that includes an input layer, and output layer, and more than one hidden layer. Method 300 may be implemented by a suitable computing system, as described further herein. For example, method 300 may be implemented by any suitable computing environment by a computing device and/or combination of computing devices, such as computing devices 101, 105, 107, and 109 of FIG. 1. Method 300 may be implemented in suitable program instructions, such as in machine learning software 127, and may operate on a suitable training set, such as training set data 129.

FIG. 4 illustrates example pseudocode algorithm 400 that may be used in an example implementation of the method illustrated in FIG. 3, and the example pseudocode will be discussed alongside the corresponding method steps.

At step 305, the system may initialize a deep neural network model $F(x, \theta_t)$. Model parameters $\theta_t$ may correspond to weights assigned to nodes and connections in the model. The model may be initialized with initial model parameters $\theta_0$. The initial model parameters may be set randomly and/or to other initial values, such as a determined set of suitable white noise values. The system may also initialize an iteration count t=0. Illustrative pseudocode corresponding to an implementation of this step may be found in lines 1-3 and 5 of FIG. 4.

At step 310, the system may select an initial mini-batch $\mathcal{D}_0$ from the training set data $\mathcal{D}$. The training set may be of size N, and the mini-batch may be of size M<N. The mini-batch may comprise a subset of randomly selected examples from the broader training set. Use of a mini-batch during each iteration of the model training process may reduce computational burdens associated with computing model predictions for every example in a very large data set while maintaining acceptable results. Illustrative pseudocode corresponding to an implementation of this step may be found in line 7 of FIG. 4.

At step 315, the system may iteratively train the model through a model training process. The system may train the model, based on the training set, to refine the model parameters through a plurality of first iterations using a first loss function and a plurality of second iterations using a second, weighted loss function, as described further herein. Steps 320-360 may be performed for each iteration of the model training process, governed based on burn-in criteria in step 320 and stopping criteria in step 355. Illustrative pseudocode corresponding to an implementation of this step may be found in line 7 of FIG. 4.

At step 320, the system may determine a mini-batch accuracy of the current model. The system may determine a number of correctly and/or incorrectly classified examples, and compute a corresponding accuracy for the current model. The model training process may be configured with a tunable accuracy threshold and/or iterations threshold as part of a scheduled boosting configuration. The system may, in some implementations, engage in scheduled boosting by initially training the model using a first loss function and/or objective before switching to a second loss function and/or objective after burn-in threshold criteria are met, as described above. According to some aspects, the first loss function/objective may be the maximum likelihood objective set forth above in equation (3). The second loss function/objective may be the DeepBoost objective set forth above in equation (4), and/or any of the functions derived therefrom above. Illustrative pseudocode corresponding to an implementation of this step may be found in line 9 of FIG. 4.

Thus, at step 320 the system determines whether to compute mini-batch loss using a first loss function or a second, weighted loss function. If the mini-batch accuracy of the current model is less than the accuracy threshold and if the number of boosting iterations is less than the burn-in iterations threshold, the system may proceed to train the model using a first loss function such as the maximum likelihood objective of equation (3) (step 320, branch Y). If either the accuracy threshold or the burn-in iterations threshold are exceeded, the system may proceed to train the model using a second, weighted loss function such as DeepBoost equation (4) (step 320, branch N). In implementation, the system may be configured such that a first plurality of training iterations are performed using the first loss function and a second plurality of training iterations are performed using the second loss function. Alternative implementations may utilize the accuracy threshold and/or burn-in iterations threshold in other manners, such as by continuing to use the first loss function until both measures are above their respective thresholds, or by conditioning the determination of which loss function to use on just one of the threshold measures, for example.

At step 330, after determining that the threshold criteria have not been exceeded (or otherwise satisfied), the system may compute the mini-batch loss for the current model using a first loss function. According to some aspects, the first loss function may be the maximum likelihood objective of equation (3), or a function having a similar and/or equivalent form. The first loss function may be associated with the conditional probabilities of each example in the first mini-batch. The first loss function may be a function of the negative log-likelihood of the model parameters given the mini-batch examples. Illustrative pseudocode corresponding to an implementation of this step may be found in line 10 of FIG. 4.

At step 335, the system may update model parameters $\theta_t$ based on minimizing the average gradient of the mini-batch loss calculated using the first loss function, such as through stochastic gradient descent as illustrated in equation (2). The average may be determined based on the full size of the mini-batch, and the mini-batch loss may be determined based on each example in the mini-batch. Computing the average gradient of the mini-batch loss may allow the system to minimize the negative log-likelihood loss of the input-output of the mini-batch examples through stochastic gradient descent methods. Illustrative pseudocode corresponding to an implementation of this step may be found in line 14 of FIG. 4.

At step 350, which will be discussed further below, the system may evaluate whether stopping criteria for the model training process have been met. As one example, the system may evaluate whether a threshold number of total training iterations have been completed.

If the stopping criteria are not met (step 355, branch N), at step 360 the system may increment iterations t=t+1 and select a new mini-batch. Processing may return to step 315 and the system may continue to iteratively train the model. Illustrative pseudocode corresponding to an implementation of this step may be found in lines 7 and 16 of FIG. 4.

If either the accuracy threshold or the burn-in iterations threshold are exceeded, or other burn-in criteria are satisfied, the system may proceed to train the model using a second, weighted loss function such as DeepBoost equation (4) (step 320, branch N) as discussed above.

At step 340, after determining that the threshold criteria have been met (or otherwise satisfied), the system may compute the mini-batch loss for the current model using a second loss function, such as the DeepBoost function described above in equation (4) and its derived functions. The second loss function may comprise a weighting factor such that correctly classified examples are given zero weight. According to some aspects, the second loss function may correspond to the first loss function with the addition of the weighting factor. In some alternative implementations, the weighting factor may assign a non-zero weight to some or all of the correctly classified examples. For example, in an alternative implementation the system may assign a weight other than zero but less than one to correctly classified examples, while assigning a weight of one or higher to incorrectly classified examples. The second loss function may be a function of the weighted negative log-likelihood of the model parameters given the mini-batch examples. Illustrative pseudocode corresponding to an implementation of this step may be found in lines 11 and 12 of FIG. 4.

At step 345, the system may update model parameters $\theta_t$ based on minimizing the average gradient of the mini-batch loss calculated using the second loss function, such as through stochastic gradient descent as illustrated in equation (2). The average may be determined based on the full size of the mini-batch, and the mini-batch loss may be determined based on each example in the mini-batch. Computing the average gradient of the mini-batch loss may allow the system to minimize the weighted negative log-likelihood loss of the input-output of the mini-batch examples through stochastic gradient descent methods. Illustrative pseudocode corresponding to an implementation of this step may be found in line 14 of FIG. 4.

In step 345, the system may determine the average gradient of the second loss function based on a total size of the second mini-batch, despite the fact that a zero weighting has been applied to correctly classified examples. Thus, the correctly classified examples may have their loss contributions given zero weight, while the gradient average remains computed over the entire size of the mini-batch.

Returning to step 350, the system may evaluate the current model based on one or more stopping criteria. Example stopping criteria may be based on the number of training iterations, the mini-batch accuracy of the model, the accuracy of the model based on a validation set, and/or any other suitable stopping criteria. For example the stopping criteria may comprise a maximum number of training iterations. As another example, the stopping criteria may comprise a threshold accuracy of the model for a validation training set. As still another example, the stopping criteria may comprise a threshold accuracy of the model for a mini-batch. And as another example, the stopping criteria may be based on determining that a given second iteration did not result in updated model parameters due to each example of the second mini-batch being correctly classified. Illustrative pseudocode corresponding to an implementation of this step may be found in line 15 of FIG. 4.

At step 355, the system may determine whether the stopping criteria are met. If the stopping criteria are met (step 355, branch Y), then the model generated by the first and second pluralities of training iterations and defined by the refined model parameters is deemed trained. Illustrative pseudocode corresponding to an implementation of this step may be found in line 15 of FIG. 4.

At step 370, the trained model $F(x,\theta_{final})$ may be output and/or stored. The trained model may be used to generate predictions based on an input data set. For example, the trained model may be configured to generate predictions regarding speech recognition, image recognition, and/or any other suitable application for deep neural networks. Illustrative pseudocode corresponding to an implementation of this step may be found in line 18 of FIG. 4.

Some aspects described herein may provide benefits for deep neural network training, such as: yielding a higher entropy output distribution without sacrificing the maximum likelihood result, not reducing model capacity during training so as to easily complement other capacity reduction regularizers such as dropout and dropconnect, taking care of label class imbalance, providing regularization and improving generalization, improve model robustness against random label noise, providing an automatic stopping criterion for neural network training, removing the need for cross-validation for model selection, removing the need to train an ensemble of deep neural networks, providing an adaptive learning rate during training, jointly optimizing accuracy (non-differentiable) and the loss function (differentiable), producing a steepest gradient decent in the direction that maximizes accuracy during training, and/or optimizing an approximate of the mutual information objective rather than the traditional negative log-likelihood objective.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   initializing a model having a deep neural network architecture and a plurality of model parameters, wherein the deep neural network architecture comprises an input layer, and output layer, and a plurality of hidden layers;
   training the model, based on a training set comprising a plurality of examples, to refine the plurality of model parameters through a plurality of first iterations, wherein each respective first iteration of training the model comprises:
      determining a corresponding first mini-batch for the respective first iteration based on the training set, wherein the first mini-batch comprises a subset of the examples of the training set; and
      updating the plurality of model parameters based on minimizing an average gradient of a first loss function for each example in the first mini-batch;
   training the model, based on the training set, to refine the plurality of model parameters through a plurality of second iterations, wherein each respective second iteration of training the model comprises:
      determining a corresponding second mini-batch for the respective second iteration based on the training set, wherein the second mini-batch comprises a subset of the examples of the training set; and
      updating the plurality of model parameters based on minimizing an average gradient of a second loss function for each example in the second mini-batch, wherein the second loss function comprises a weighting factor configured such that correctly classified examples are given zero weight, and wherein the average gradient of the second loss function is determined based on a size of the second mini-batch;
   determining that the trained model, as defined by the refined plurality of model parameters trained through the plurality of first iterations and the plurality of second iterations, satisfies one or more stopping criteria; and
   generating one or more predictions based on an input data set using the trained model.

2. The method of claim 1, wherein training the model through the plurality of first iterations using the first loss function is based on determining that a total number of training iterations does not satisfy a burn-in threshold.

3. The method of claim 2, wherein training the model through the plurality of second iterations using the second loss function is based on determining that the total number of training iterations satisfies the burn-in threshold.

4. The method of claim 1, wherein training the model through the plurality of first iterations using the first loss function is based on determining that a mini-batch accuracy of the model does not satisfy an accuracy threshold.

5. The method of claim 4, wherein training the model through the plurality of second iterations using the second loss function is based on determining that the mini-batch accuracy of the model satisfies the accuracy threshold.

6. The method of claim 1, wherein the one or more stopping criteria comprises a maximum number of training iterations.

7. The method of claim 1, wherein the one or more stopping criteria comprises a threshold accuracy of the model for a validation training set.

8. The method of claim 1, wherein the one or more stopping criteria comprises a threshold accuracy of the model for a mini-batch.

9. The method of claim 1, wherein the one or more stopping criteria is based on determining that a given second iteration did not result in updated model parameters due to each example of the second mini-batch being correctly classified.

10. The method of claim 1, wherein the model is configured to generate predictions regarding speech recognition.

11. The method of claim 1, wherein the model is configured to generate predictions regarding image recognition.

12. The method of claim 1, wherein the deep neural network architecture comprises a convolutional neural network.

13. The method of claim 1, wherein the deep neural network architecture comprises a recurrent neural network.

14. The method of claim 1, wherein the deep neural network architecture comprises a feed forward neural network.

15. The method of claim 1, wherein the first loss function is a function of the negative log-likelihood of the model parameters given the mini-batch examples.

16. The method of claim 15, wherein the second loss function is a function of the weighted negative log-likelihood of the model parameters given the mini-batch examples.

17. A system comprising:
a database configured to store a training set comprising a plurality of examples, wherein each example comprises an input and a ground truth output and is associated with a conditional probability of the ground truth output given the input;
one or more processors; and
memory storing instructions that, when executed by the one or more processors, cause the one or more processors to:
initialize a model having a deep neural network architecture and a plurality of model parameters, wherein the deep neural network architecture comprises an input layer, and output layer, and a plurality of hidden layers;
train the model, based on the training set, to refine the plurality of model parameters through a plurality of first iterations, wherein the instructions cause the one or more processors to perform each respective first iteration of training the model by causing the one or more processors to:
determine a corresponding first mini-batch for the respective first iteration based on the training set, wherein the first mini-batch comprises a subset of the examples of the training set; and
update the plurality of model parameters based on minimizing an average gradient of a first loss function associated with the conditional probabilities of each example in the first mini-batch;
train the model, based on the training set, to refine the plurality of model parameters through a plurality of second iterations, wherein the instructions cause the one or more processors to perform each respective second iteration of training the model by causing the one or more processors to:
determine a corresponding second mini-batch for the respective second iteration based on the training set, wherein the second mini-batch comprises a subset of the examples of the training set; and
update the plurality of model parameters based on minimizing an average gradient of a second loss function associated with the conditional probabilities of each example in the second mini-batch,
wherein the second loss function comprises a weighting factor configured such that the conditional probabilities of correctly classified examples are given zero weight, and
wherein the average gradient of the second loss function is determined based on a total size of the second mini-batch;
determine that the trained model, as defined by the refined plurality of model parameters trained through the plurality of first iterations and the plurality of second iterations, satisfies one or more stopping criteria; and
store the trained model based on the refined plurality of model parameters.

18. The system of claim 17, wherein the instructions cause the one or more processors to:
train the model through the plurality of first iterations using the first loss function based on determining that a total number of training iterations does not satisfy a burn-in threshold, and
train the model through the plurality of second iterations using the second loss function based on determining that the total number of training iterations satisfies the burn-in threshold.

19. The system of claim 17, wherein the instructions cause the one or more processors to:
train the model through the plurality of first iterations using the first loss function based on determining that a mini-batch accuracy of the model does not satisfy an accuracy threshold, and
train the model through the plurality of second iterations using the second loss function based on determining that the mini-batch accuracy of the model satisfies the accuracy threshold.

20. One or more non-transitory media storing instructions that, when executed by one or more processors, cause the one or more processors to perform steps comprising:
initializing a model having a deep neural network architecture and a plurality of model parameters, wherein the deep neural network architecture comprises an input layer, and output layer, and a plurality of hidden layers;
determining a training set comprising a plurality of examples;
training the model, based on the training set and on a total number of training iterations not exceeding a burn-in threshold, to refine the plurality of model parameters through a plurality of first iterations, wherein each respective first iteration of training the model comprises:
determining a corresponding first mini-batch for the respective first iteration based on the training set, wherein the first mini-batch comprises a subset of the examples of the training set; and
updating the plurality of model parameters based on minimizing an average gradient of a negative log-likelihood for each example in the first mini-batch;
training the model, based on the training set and on the total number of training iterations exceeding the burn-in threshold, to refine the plurality of model parameters through a plurality of second iterations, wherein each respective second iteration of training the model comprises:
determining a corresponding second mini-batch for the respective second iteration based on the training set, wherein the second mini-batch comprises a subset of the examples of the training set; and
updating the plurality of model parameters based on minimizing an average gradient of a weighted negative log-likelihood for each example in the second mini-batch,
wherein the weighted negative log-likelihood comprises a weighting factor configured such that correctly classified examples are given zero weight, and
wherein the average gradient of the weighted negative log-likelihood is determined based on a total size of the second mini-batch;
determining that the trained model, as defined by the refined plurality of model parameters trained through the plurality of first iterations and the plurality of second iterations, satisfies one or more stopping criteria; and
generating one or more predictions based on an input data set using the trained model.

\* \* \* \* \*